Aug. 15, 1933.  M. T. CHAMBERLAIN  1,922,929
MEANS FOR KEYING MEMBERS ON SHAFTS
Filed Feb. 2, 1931
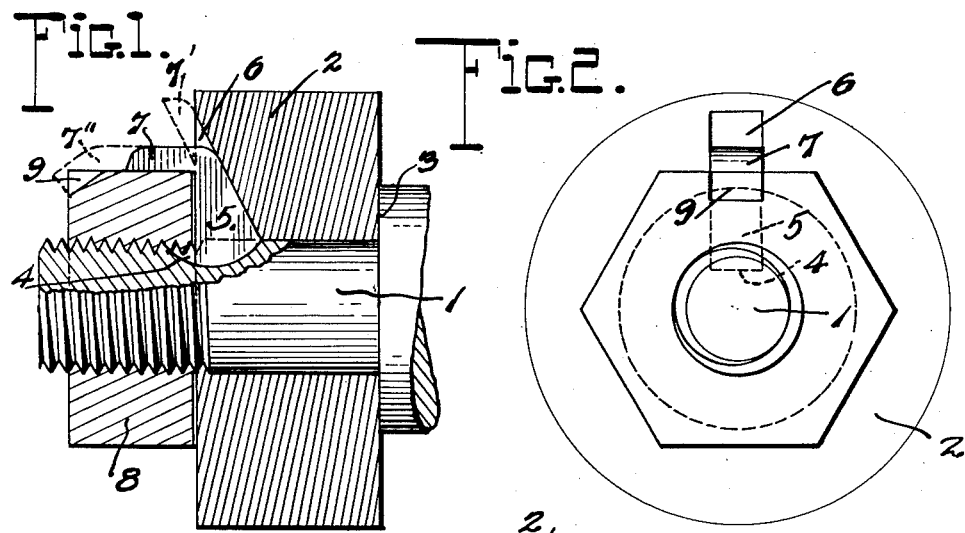
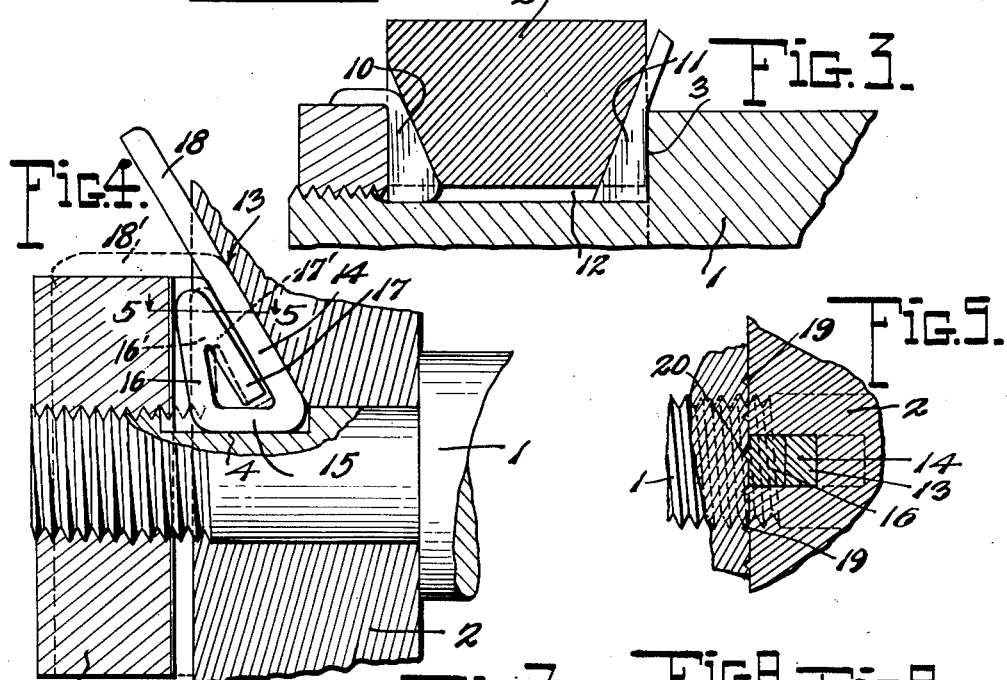
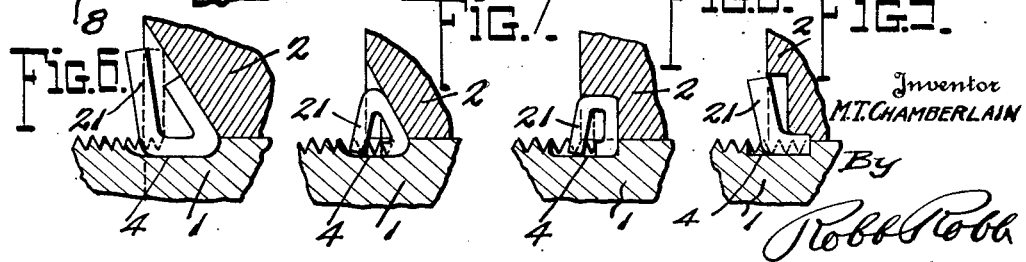
Inventor
M. T. CHAMBERLAIN
By
Robb & Robb
Attorneys Patented Aug. 15, 1933

1,922,929

UNITED STATES PATENT OFFICE 1,922,929

MEANS FOR KEYING MEMBERS ON SHAFTS

Martin T. Chamberlain, Mobile, Ala., assignor of one-half to J. C. Lawrence, Mobile, Ala.

Application February 2, 1931. Serial No. 513,034

9 Claims. (Cl. 287—53)

The present invention relates to means for securing devices such as gears, pulleys, cams, rollers, and the like, to shafts or other similar supports therefor.

Numerous devices for securing gears to shafts are at the present time employed, such as standard keys, dowel pins, set screws, cotter pins, etc., but the use of many of these securing means is limited to light work involving the transmission of comparatively small quantities of power. Frequently, the removal of gears and the like from shafts which have been secured thereto by the usual standard keys is exceedingly difficult, especially after the keys have become battered and distorted by long use.

It is an object of this invention to overcome the aforementioned difficulties in the provision of suitable securing means which is equally adaptable for use for comparatively heavy duty work as well as small or light work, the construction of the said securing means being such as to greatly facilitate the application of the gear or pulley to, and removal from the shaft, the operations being very simple and capable of being performed quickly.

The invention is further characterized by the use of a key of novel construction, together with a locking nut, the key locking the gear or pulley with the shaft and the nut locking both the key and gear in position, the key also cooperating with the nut to constitute a locking means for the nut.

A further object of the invention is to provide a resilient key which is adapted to be engaged and compressed by a locking nut which is maintained in locking position by the pressure of the key thereagainst.

A still further object of the invention is to provide a key formed of resilient material and bent to provide arms extending angularly with relation to each other, said key being adapted to lock the gear or pulley with the shaft and having an arm normally projecting slightly beyond the face of the gear or pulley so as to be engaged by a locking nut adapted to force the key into its seat or keyway, the locking nut being maintained in locking position by the key.

Other and further objects and advantages of the invention will be hereinafter set forth and the novel features thereof defined by the appended claims.

In the drawing:

Fig. 1 is a longitudinal sectional view through a shaft having a member such as a gear or pulley secured thereto in accordance with the invention, a portion of the shaft being shown in elevation;

Fig. 2 is an end view looking towards the outer end of the shaft;

Fig. 3 is a fragmentary longitudinal sectional view of a modified form of securing means wherein a pair of keys is employed at opposite sides of the member;

Fig. 4 is a sectional view similar to Fig. 1 showing the use of a modified key construction;

Fig. 5 is a sectional view taken on the line 5—5 of Fig. 4; and

Figs. 6 to 9 are fragmentary longitudinal sectional views of various modified forms of key constructions, the keys being shown in elevation.

Like reference characters designate corresponding parts throughout the several figures of the drawing.

In the simplest form of the invention, as illustrated in Figs. 1 and 2, 1 denotes a shaft on which a gear, pulley, or other suitable member 2 is to be secured, the shaft being provided with a suitable shoulder 3 or other abutment against which the gear is adapted to bear. The shaft 1 is provided with a suitable longitudinal slot or keyway 4, preferably extending slightly beyond the front face of the member 2 to facilitate the insertion and removal of the key 5 adapted to be inserted in the keyway 4 and corresponding registering keyway 6 formed in the face of the member 2.

The keyway 6 in the member 2 is shown as being cut into the face of the member from the front and being of greater depth at the front face of the member than at the rear of the keyway, the rear wall of the keyway inclining angularly from the face of the member towards the shaft. In this form of the invention, the key 5 is formed as a solid member, and having an extension or arm 7 adapted to be bent from the dotted line position 7' into engagement with a suitable locking nut 8 threaded on the end of the shaft 1, thereby maintaining the locking nut in locking position after the same has been screwed tightly against the key and member 2 to positively maintain these parts in position on the shaft. If desired, the arm or extension 7 may be made sufficiently long, as indicated by the reference character 7", so as to be bent over the front face of the nut for engagement in a suitable notch or notches 9 in the face thereof.

It is to be understood that the configuration of the keyways and the keys may be varied to meet the conditions of economic manufacture and the like, additional modified forms of keys 10 and 11 being illustrated in the double keying form shown in Fig. 3 of the drawing, and the keyway 12 in the shaft being of substantially the same depth throughout its length, as distinguished from the half-moon shape as shown in Fig. 1. Obviously, the size of the keys and keyways may be varied depending upon the power transmitted and the size of the gear or pulley and associated parts.

A further modified form of the invention is illustrated in Figs. 4 and 5 wherein the key 13 is formed of suitable resilient material which is bent to provide arms extending in angular relation to each other, certain of said arms, namely, 16 and 17, normally being adapted to project slightly beyond the front face of the member 2 so as to be first engaged by the locking nut 8 and forced inwardly to the dotted line positions indicated by 16' and 17'. Thus, the key is placed under compression and normally tends to maintain the locking nut in locking position after the same has been firmly tightened. If desired, the key may also be provided with an extension 18 which may be bent into engagement with the locking nut as shown at 18'.

Obviously, any suitable means for resisting loosening of the locking nut may be employed, as, for example, by roughening the key-engaging face of the nut, or by suitably forming notches 19 in the key-engaging face, which notches are adapted to be engaged by a suitable detent or projection 20 formed on the nut-engaging face of the key, as shown in Fig. 5.

Various other modifications of the key construction are illustrated in Figs. 6 to 9, in all of which there is provided a resilient arm 21 normally extending slightly beyond the front face of the member 2 to be engaged by the locking nut for maintaining the same in locking position. In Figs. 6 and 7, the key is substantially triangular in shape and one form being substantially the same as the other only inverted. Fig. 8 is a key of substantially rectangular configuration, whereas in Fig. 9 the key is substantially L-shaped.

It is to be understood that the primary features of the invention in all of the forms illustrated are the provision of a key which is adapted to lock the gear or pulley, or other member, with the shaft, and a locking nut which is adapted to lock both the key and gear in position, the key further constituting a positive locking means for maintaining the locking nut in locking position.

From the foregoing, the method of assembly of the gear or pulley on the shaft should be obvious and may be briefly summarized as follows:

The gear or other member is first placed upon the shaft and shifted to bring its keyway into register with the keyway in the shaft, whereupon the key is placed in the keyway and the nut screwed up firmly against the key and gear member. In the forms in which projections on the keys are provided, the said projections are then bent down into engagement with the locking nut to maintain the same in position.

For removal of the gear member, the operation just described is followed in the reverse order, all of which operations are very simple and reduce the time of removal and replacement to the minimum.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. In a device of the class described, a shaft having a longitudinal keyway therein, a member adapted to be secured to said shaft and having a longitudinal keyway therein in register with the keyway in said shaft, a key in said registered keyways, a locking nut carried by the said shaft and adapted to engage the said key for locking the same in position, and means formed on said key for maintaining said nut in key locking position.

2. In a device of the class described including a supporting member, a supported member removably carried thereby and adapted to be locked in position thereon, locking means interposed between said supporting member and supported member for resisting relative rotative movements between the same, and locking means for resisting longitudinal movements thereof, said last mentioned locking means being maintained in locking position by the first mentioned locking means.

3. In a device of the class described, a shaft, a member to be secured thereon, the said shaft and member having keyways therein in registering relation, a key in said keyways, said key having a resilient arm normally extending beyond the face of said member, and locking means engaging said arm for forcing the same into said keyway, said locking means being maintained in locking position by the pressure of the resilient arm against the same.

4. In a device of the class described, a shaft, a member to be secured thereon, the said shaft and member having keyways therein in registering relation, a key in said keyways, said key having a resilient arm normally extending beyond the face of said member, and locking means having a roughened surface engaging said arm for forcing the same into said keyway, said locking means being maintained in locking position by the frictional resistance of the resilient arm against the same.

5. In a device of the class described, a shaft, a member to be secured thereon, the said shaft and member having longitudinal keyways therein in registering relation, a key in said keyways, said key having a resilient arm normally extending beyond the face of said member, and a locking nut carried by said shaft and engaging said arm for forcing the same into said keyway, said nut having notches in the key-engaging face thereof, and said arm having a projection formed thereon for engaging said notches whereby to maintain the nut in locking position.

6. In a device of the class described, a shaft, a member to be secured thereon, the said shaft and member having keyways therein in registering relation, an angularly bent key in said keyways, and a locking nut for engaging said key and member to maintain the same in position on said shaft, said nut being maintained in locking position by the said key.

7. In a device of the class described, a shaft, a member to be secured thereon, the said shaft and member having longitudinal keyways therein in registering relation, a key in said keyways, and a locking nut engaging said key and member to maintain the same in position on said shaft, said key having an extending arm adapted to be bent into engagement with the sides of said nut for maintaining the nut in locking position.

8. In a device of the class described, a shaft, a member to be secured thereon, the said shaft and member having keyways therein in registering relation, a key in said keyways, and a locking nut for engaging said key and member to maintain the same in position on said shaft, said nut having a recess in one face thereof, and said key having an extending arm adapted to be bent into engagement with the recess in said nut for maintaining the nut in locking position.

9. In a device of the class described, a shaft, a member to be secured thereon, said shaft having an abutment for resisting longitudinal movement of said member therealong and having a keyway extending longitudinally thereof, said member having keyways in opposite faces adapted to register with the keyway in said shaft, a pair of keys in said keyways, one of said keys being engaged by the abutment on said shaft, and a locking nut carried by said shaft for engaging the other of said keys, said locking nut being positively maintained in locking position by its associated key.

MARTIN T. CHAMBERLAIN.